March 3, 1931. O. HEINISCH ET AL 1,794,686
SAFETY SYSTEM FOR ELECTRIC PLANTS
Filed Nov. 20, 1928
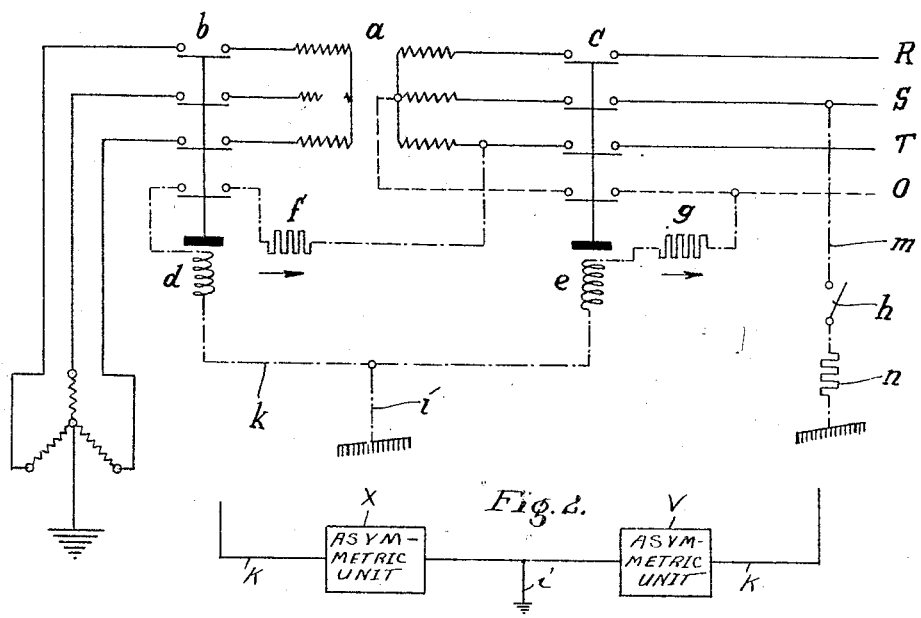
Otto Heinisch
Anton Riedl
by C. P. Goepel
their Attorney.

Patented Mar. 3, 1931

1,794,686

UNITED STATES PATENT OFFICE

OTTO HEINISCH, OF OBRIGHOVEN, NEAR WESEL, AND ANTON RIEDL, OF FLUREN, NEAR WESEL, GERMANY

SAFETY SYSTEM FOR ELECTRIC PLANTS

Application filed November 20, 1928, Serial No. 320,584, and in Germany October 7, 1927.

Our invention relates to improvements in safety systems for electric plants, and the object of the improvements is to provide a system for immediately disconnecting the conductors normally connected with the supply of electric energy from the said supply whenever contact is made with one of the conductors. With this object in view our invention consists in connecting two conductors of the system, for example two outer conductors or phase conductors, or an outer conductor and the neutral conductor with the ground by means of leads each including a coil of a switch adapted to disconnect the system from the current supply. In carrying out the invention either both coils included in the said leads are combined in a single switch or each coil is provided in a switch of its own, one of the switches being for example a high-tension switch and the other one a low-tension switch. Thus the resistance of the said leads connecting the conductors with the ground is such that a current successively flowing through both leads from one phase conductor to the other one or from the phase conductor to the neutral conductor is not able to operate the switch, while the current flowing through one of the said coils is adapted to operate the switch. Instead of providing two separate leads for connecting the conductors with the ground a single earth connection may be provided which is connected between the said coils of the switch or switches to the lead connecting the outer wires or an outer wire and the neutral wire.

For the purpose of explaining the invention an example embodying the same has been shown in the accompanying drawing in which the same reference characters have been used in all the views to indicate corresponding parts. In said drawing, Fig. 1, is a diagram showing a net provided with our improved safety system, and Fig. 2, is a diagram showing the position of the asymmetric units in the net.

In the example shown in Fig. 1 the net comprises three phase conductors R, S, T and a neutral conductor O, the said conductors including a transformer $a$ and two switches $b$ and $c$, the switch $b$ being located in the high-tension conductors and the switch $c$ in the low-tension conductors of the transformer. The phase conductor T is connected by a lead $k$ including switch coils $d$ and $e$ and resistances $f$ and $g$ with the neutral conductor. To a point intermediate the coils $d$ and $e$ a grounded lead $i$ is connected. Further, the phase conductor S is grounded through a lead $m$ including a resistance $n$ and a testing switch $h$. Similar subsidiary switches may be provided at any part of the plant as emergency switches.

The lead $k$ is continuously energized by a certain current, which however is small by reason of the resistances included in the lead, and which therefore is not sufficient to operate the switches $b$ and $c$. If however one of the conductors O or T is connected to the ground for example by a person making contact therewith the resistance $g$ and coil $e$ or resistance $f$ and coil $d$ are short-circuited, and the current flowing through the coil which has not been short-circuited is sufficient to operate the switch and to disconnect the net from the current supply. When making a ground contact with the conductor R or S the current flowing through both switch coils is increased. The neutral conductor is insulated from the ground, because the safety system is operated also when the neutral wire is grounded, by reason of the earth connection of the outer wire.

If in alternating current distribution plants the continuous energizing of the coils $d$ and $e$ is not desired asymmetric units $x$ and $y$ may be included in the branches of the lead $k$ which permit the flow of the current in one direction only and which are included in the said branches so as to be directed in opposition to each other. Thus no current can flow from phase conductor to phase conductor or from phase conductor to neutral conductor, but there is only a flow of current from the ground if the phase conductor or the neutral conductor is grounded.

The conductors are disconnected from the current supply whenever one of the wires is grounded, for example when a person makes contact with one of the phase conductors, in which case the current flowing through one of the coils $d$ or $e$ or the current flowing through both coils $d, e$ is increased. The construction can be made so that the net is disconnected within less than $\frac{1}{10}$ of a second, which time is so short that any injury by the grounding of the conductor is avoided. Since the system is switched out also by an earth or body contact, special safety means for metallic parts which normally are not energized are not necessary.

The operation of the system can be tested at any time by means of the testing switches $h$ or $u$ adapted to ground one of the conductors and to throw one or both switches into operation.

We claim:

1. In an electrical distribution system, embodying two conductors and a source of current supply therefor, leads connecting said conductors with the ground, and switches each one of which is controlled by the current through each of said leads for disconnecting said conductors from the current supply.

2. In an electrical distribution system, embodying a plurality of main conductors, a source of current supply for the conductors, leads connecting at least two of said conductors with the ground, and switches each one of which is controlled by the current from each of said leads for disconnecting said conductors from the current supply.

3. In an electrical distribution system, embodying a plurality of main conductors and a neutral conductor, a source of current supply, leads connecting one of said main conductors and said neutral conductor with the ground, and switches associated with said leads, each switch being connected to be controlled by the current from each of said leads for disconnecting said main conductors and neutral conductor from the source of supply.

4. In an electrical distribution system, embodying two conductors and a source of current supply therefor, leads connecting said conductors with the ground, resistances included in said leads, switches with coils included in the leads at points on the ground side of the resistances, each switch, by the energization of its coil by current from each of said leads, being controlled to disconnect said conductors from the current supply.

5. In an electrical distribution system, embodying two conductors and a source of current supply therefor, a grounded lead, branch leads connecting said grounded lead with said conductors, and a switch in each branch lead controlled by current from each of said branch leads for disconnecting said conductors from the current supply.

6. In an electrical distribution system, embodying two conductors and a source of current supply therefor, leads connecting said conductors with the ground, a switch under the control of the current through said leads for disconnecting said conductors from the current supply, and means associated with said leads to restrict current therein to a flow in one direction.

In testimony whereof we hereunto affix our signatures.

OTTO HEINISCH.
ANTON RIEDL.